United States Patent Office.

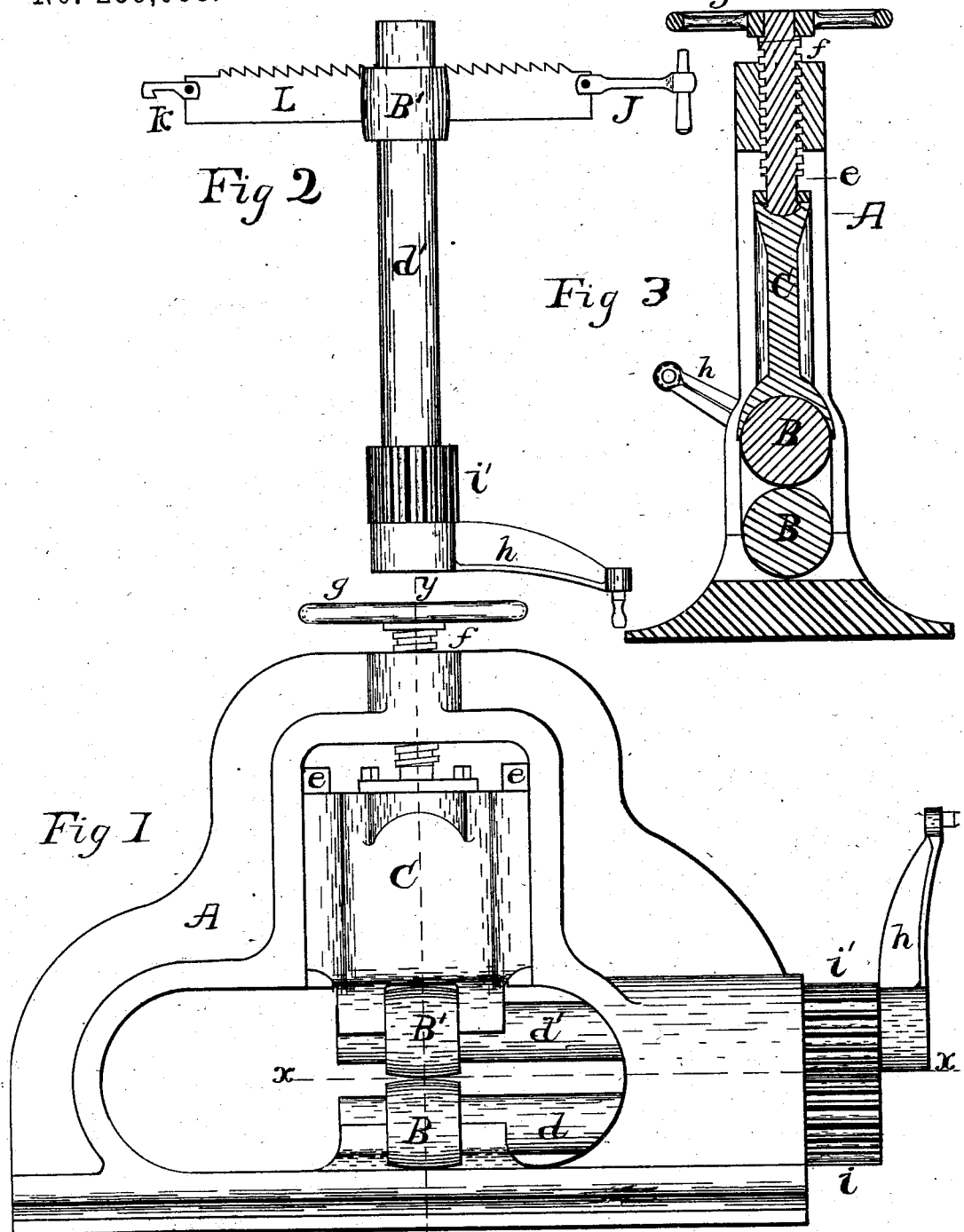

THEODORE S. WILKIN, OF EAST SAGINAW, MICHIGAN.

MACHINE FOR STRETCHING SAWS.

SPECIFICATION forming part of Letters Patent No. 259,068, dated June 6, 1882.

Application filed May 9, 1881. (No model.)

*To all whom it may concern:*

Be it known that I, THEODORE S. WILKIN, of East Saginaw, Saginaw county, and State of Michigan, have invented a certain new and useful improvement, to be known as a "Saw-Stretcher," and to be used for the purpose of stretching gang-saws, which is herein described in the following specification, reference being had to the accompanying drawings, in which—

Figure 1 represents a front view; Fig. 2, a section on the line $x\ x$ in Fig. 1; Fig. 3, a sectional view on the line $y\ y$ in Fig. 1.

My invention is designed for saws that require straining to perform their labor properly.

To fully illustrate the construction of my invention, I will refer to drawings.

A represents the frame; $d\ d'$, two shafts, upon which are fixed rollers B B' and cog-wheels $i\ i'$ and crank-arm $h$. The upper shaft, $d'$, is mounted on cross-head C, which is made to slide on ways $e\ e$ by means of the wheel G and the screw $f$, thus adjusting upper roll, B'. The shaft $d$ is mounted in frame A, the cog-wheel $i$ coming in contact with the cog-wheel $i'$, so that when the shaft $d'$ is made to revolve by means of the crank-arm $h$ or other suitable power the lower shaft, $d$, is made to revolve in an opposite direction from that of upper shaft, $d'$.

Saws of the class above named are usually hung, as shown, by strap J and hook K on saw L, in Fig. 2, on a line very near the cutting-edge of the saw. Therefore, when strained ready for labor, the greatest strain comes on a line with the hook K and strap J in Fig. 2, and very near the cutting-edge of the saw, and by this constant straining on the front or cutting edge of the saw the metal gradually yields to the strain and soon becomes longer on the edge than on the back of the saw. Consequently it becomes weak, and in a short time fails to perform the labor required of it. To obviate this my invention is particularly adapted, for by placing the back of the saw L, as shown in Fig. 2, between the rollers B B' (shown in Fig. 1) and turning the wheel G and by it the screw $f$, the cross-head C is caused to slide on the ways $e\ e$, and thereby compress the saw between the rollers B B'. The mechanism is such that by turning the crank-arm $h$ the cog-wheel $i'$ and the roller B' are revolved, the upper cog-wheel, $i'$, coming in contact with the lower cog-wheel, $i$, causing the shaft $d$ and roller B to revolve in an opposite direction, whereby the saw L is caused to move in a direction with the rollers B B'. The saw being compressed while passing between the rollers B B', and keeping the pressure nearer the back than the cutting-edge, the saw is drawn out on the back or stretched until the back becomes longer than the cutting-edge of the saw. Therefore, when the saw is strained for labor in a sash or gate the cutting-edge receives a greater tension than the back, thus enabling the saw to perform a greater amount of and much better work.

Having thus described my invention, what I claim as new, and wish to secure by Letters Patent, is—

The improved machine herein described and shown for stretching saws, consisting essentially of the frame A, the rolls B B', the gears and crank for operating the rolls, the cross-head C, and the screw $f$, substantially as specified.

THEODORE S. WILKIN.

Witnesses:
GEORGE CONWAY,
JOHN J. WHEELER.